June 24, 1924.

G. A. TIMBLIN 1,499,264

AUTOMOBILE HEADLIGHT ADJUSTER

Filed Dec. 3, 1923   2 Sheets-Sheet 1

GEORGE A. TIMBLIN INVENTOR

BY Victor J. Evans

ATTORNEY

June 24, 1924.
G. A. TIMBLIN
AUTOMOBILE HEADLIGHT ADJUSTER
Filed Dec. 3, 1923
1,499,264
2 Sheets-Sheet 2
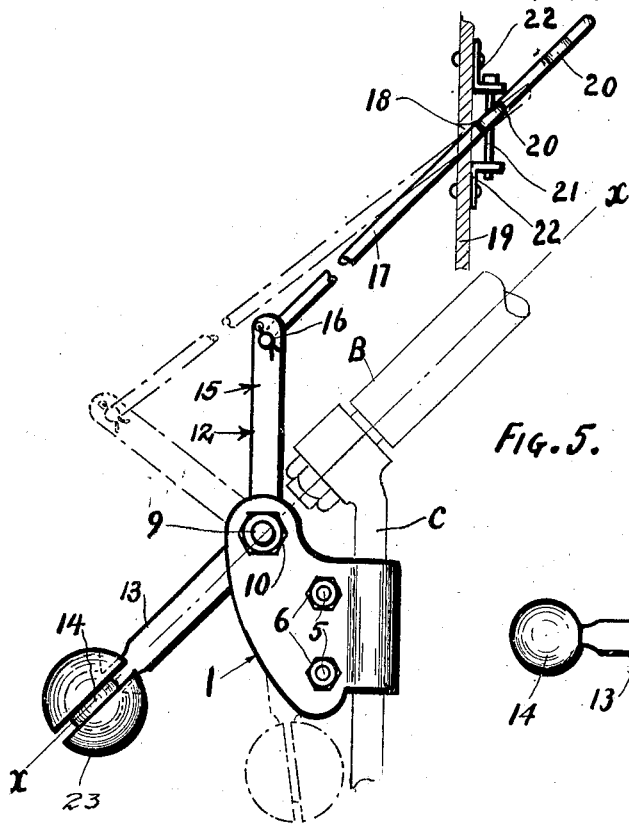
FIG. 5.
FIG. 6.
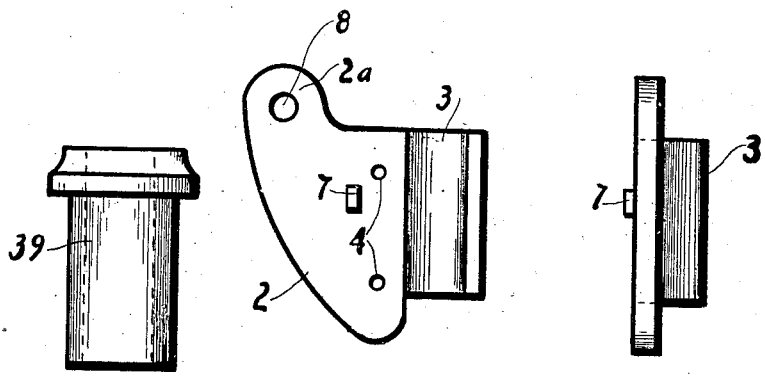
FIG. 7.   FIG. 8.   FIG. 9.
GEORGE A. TIMBLIN INVENTOR
BY Victor J. Evans
ATTORNEY Patented June 24, 1924.

1,499,264

UNITED STATES PATENT OFFICE.

GEORGE A. TIMBLIN, OF CLARK, PENNSYLVANIA, ASSIGNOR OF ONE-HALF TO GEORGE W. WEIKAL, OF CLARK, PENNSYLVANIA.

AUTOMOBILE HEADLIGHT ADJUSTER.

Application filed December 3, 1923. Serial No. 678,309.

*To all whom it may concern:*

Be it known that I, GEORGE A. TIMBLIN, a citizen of the United States, residing at Clark, in the county of Mercer and State of Pennsylvania, have invented new and useful Improvements in Automobile Headlight Adjusters, of which the following is a specification.

This invention relates to dirigible headlights, and more particularly to what I term an automobile headlight adjuster.

One of the main objects of the invention is to provide simple and efficient means whereby the headlights of an automobile can be readily connected to the steering gear so as to be moved thereby in accordance with movement of the front wheels of the automobile. A further object is to provide apparatus of this character by means of which the headlights can be quickly and easily thrown out of operation, when desired, so as to be directed forwardly of the automobile and not move with the front wheels thereof. Another object is to provide means of the character stated of simple construction and operation which may be readily applied without necessitating changes in the structure of the automobile or the steering gear. Further objects will appear from the detail description.

In the drawings:—

Fig. 5 is a detail plan view of the adjusting lever and associated parts;

Fig. 6 is a detail of the adjusting lever;

Fig. 7 is a detail of the bushing for supporting the headlight bracket;

Fig. 8 is a detail inner face view of one of the plates of the lever supporting clamp;

Fig. 9 is an edge view of the plate illustrated in Fig. 8.

Figures 1, 2:
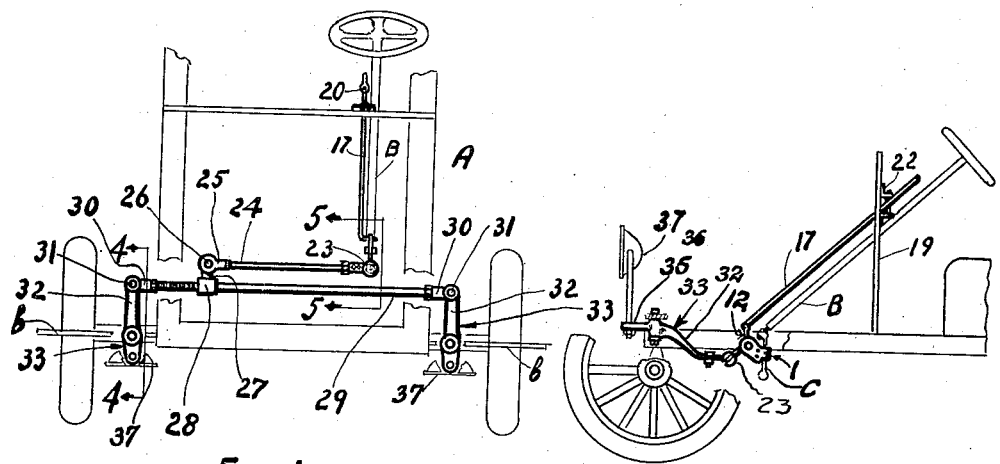
Fig. 1 is a plan view of the device indicating the manner of its application.
Fig. 2 is a side view of the device as applied.
Figure 3:
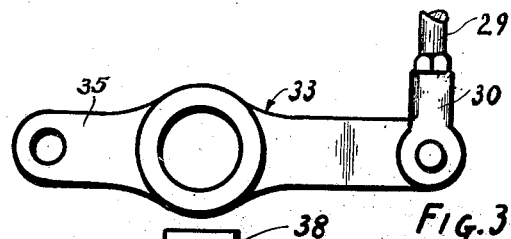
Fig. 3 is a top plan view of one of the light supporting brackets.
Figure 4:
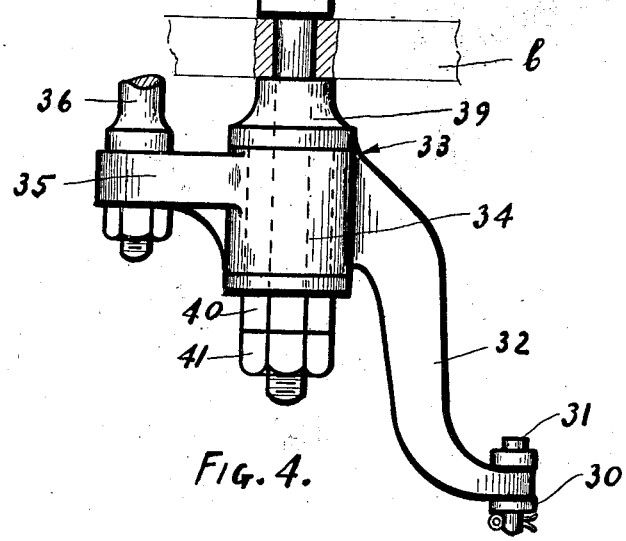
Fig. 4 is a side view of one of the light supporting brackets and associated parts.

The device is intended to be used in connection with an automobile A of standard construction which includes front fender braces *b* and a steering rod B on the lower end of which is secured a steering arm C, this arm being disposed at an angle to rod B. As will be readily understood, arm C is connected to the steering gear of the automobile in a well known manner so that by turning rod B the front wheels of the automobile are turned for guiding or steering the same. The present invention contemplates connecting means to the steering arm C in such manner that the headlights of the automobile may be caused to move in accordance with movement of the front wheels of the vehicle or, if desired, may remain stationary without in any way interfering with the movement of the front wheels. With this object in view I provide a clamp 1 consisting of two plates 2 each of which is provided with a clamping element 3 shaped to fit about arm C. Each plate is further provided with two spaced openings 4 for reception of securing screws 5 on which are threaded nuts 6 for clamping the plates tightly about arm C. One of the plates is further provided with a lug 7 positioned a slight distance beyond openings 4, this lug serving to space the plates apart while permitting the elements 3 to be forced tightly about arm C so as to grip the same. Each plate 2 is of substantially triangular shape and is provided, at its upper forward corner, with an ear $2^a$ through which extends an opening 8 for reception of a pivot screw 9 which passes through both of the plates and receives a securing nut 10 threaded thereon. Pivot screw 9 also passes through an eye 11 provided at the angle of an angle lever 12 the lower arm 13 of which is provided, at its forward end, with a ball 14. Upper arm 15 of lever 12 is provided with an opening, adjacent to its upper end, which receives a finger 16 provided at the lower end of an adjusting rod 17 which passes through opening 18 provided in dash board 19 of the automobile. This rod is provided, at its upper portion, with two substantially U-shaped bends 20 which are similarly directed and are adapted for engagement about a pin 21 supported in vertical position upon dash board 19 by angle brackets 22. As will be noted more clearly from Fig. 5, the axis of pivot bolt 9 is disposed in the plane of and at right angles to the axis X—X of steering rod B. By adjusting rod 17 angle lever 12 can be adjusted so as to bring the center of ball 14 into and out of coincidence with the axis of steering rod B. When the lower bend 20 of rod 17 is in engagement about pin 21 arm 13 of lever 12 is raised so that the axis of steering rod B passes through the center of pivot bolt 9 and ball 14, as illustrated in Fig. 5. By depressing rod 17 so as to bring the upper bend 20 into engagement with pin 21, arm 13 of lever 12 is lowered into substantially the position indicated in Fig. 5 thus bringing the center of ball 14 out of alignment with the axis of the steering rod.

Ball 14 fits into a socket member 23 secured on one end of an operating rod 24, the ball and the socket member forming a ball and socket connection of a well known type between the lever and one end of operating rod 14. A clevis 25 is secured on the other end of rod 24 and is pivoted at 26 to a lug 27 which is pivotally secured in a sleeve 28 to turn about an axis at right angles to the axis of the sleeve. Sleeve 28 is threaded or otherwise secured upon a connecting rod 29 upon each end of which is secured a clevis 30 which is pivotally secured at 31 to the rearward arm 32 of a bracket 33. A sleeve 34 is provided at the forward end of arm 33 and an arm 35 extends forwardly from this sleeve and is provided with an opening for reception of a light post or standard 36 provided at its upper end with a fork for supporting a headlight 37 in a known manner, the post 36 being secured in arm 35 in any known or preferred manner so as to be held against movement relative thereto. A pivot bolt 38 passes through fender brace b, this bolt also passing through a bushing 39 of suitable type which extends through sleeve 34. A flanged nut 40 is threaded on the lower portion of bolt 38 and co-operates with the bushing to hold sleeve 34 against endwise movement while permitting ready turning of the sleeve about the bushing. Preferably a jamb nut 41 is threaded onto bolt 38 against nut 40 so as to hold the latter against reverse rotation. With the angle lever 12 in the broken line position indicated in Fig. 5, when steering rod B is turned, arm C is turned with the rod and, by means of clamp 1 and the parts associated therewith the headlight brackets 32 are turned about their axes simultaneously with and similarly to the front wheels of the automobile. This provides a very simple and highly efficient dirigible mounting for the headlights which can be readily applied to an automobile of standard construction without necessitating any changes whatever in the steering gear. When it is not desired to have the headlights turn with the front wheels of the automobile, rod 17 is raised so as to adjust lever 12 about pivot screw 9 raising arm 13 into the position illustrated in Fig. 5, in which position the arm is held by rod 17 and the associated parts. This brings ball 14 on dead center with the axis of steering rod B so that any movement or turning of rod B will serve merely to turn ball 14 in socket member 23 without imparting any longitudinal movement to rod 24, thus rendering the apparatus for turning the headlights inoperative and insuring that the headlights will remain directed forwardly of the automobile when the lever 12 is in the position illustrated in Fig. 5. To insure ease of operation and prevent binding of parts, the ball 14 preferably fits loosely in socket member 23, though this is not essential as any slight longitudinal movement which might be imparted to rod 24 when the lever 12 is adjusted from one position to the other would not materially affect the positions of the headlights. While I have illustrated and described the brackets 33 as mounted on fender braces b, these brackets can be mounted upon the side sills of the automobile chassis or can be supported in any other suitable or preferred manner, as will be understood. Also, if desired, other means than that illustrated and described can be employed for holding the rod 17 in adjustment.

As will be understood, and as above indicated, changes in construction and arrangement of parts of the invention may be resorted to without departing from the field and scope of the same, and I intend to include all such variations, as fall within the scope of the appended claims, in this application in which a preferred form only of my invention is disclosed. While I have illustrated and described my invention as used in connection with an automobile, I do not intend to in any way limit myself to this one particular use as my invention may be used in connection with any other vehicle to which my invention can be applied, as will be understood.

What I claim is:—

1. In combination with an automobile including a steering rod and an arm secured on said rod in angular relation thereto, supporting members mounted on the automobile, lights carried by said members, an operating rod, connections between one end of said rod and the supporting members for turning the latter in accordance with movement of the former, an adjusting lever mounted on the arm, ball and socket connections between one arm of the lever and the other end of said rod, and means for adjusting said lever so as to bring the center of said ball and socket connections into and out of coincidence with the axis of said rod.

2. In combination with an automobile including a steering rod and an arm secured on said rod in angular relation thereto, supporting members mounted on the automobile, lights carried by said members, an operating rod, connections between one end of said rod and the supporting members for turning the latter in accordance with movement of the former, an adjusting lever mounted on the arm, pivotal connections between one arm of the lever and the other end of said rod, and means for adjusting said lever so as to bring the axis of said pivotal connections into and out of coincidence with the axis of said rod.

3. In combination with an automobile including a steering rod and an arm secured on said rod in angular relation thereto, brackets mounted on the automobile to turn about vertical axes, lights carried by said brackets, an operating rod, connections between one end of the rod and said brackets for turning the latter in accordance with movement of the former, an angle lever mounted on the arm and adjustable into either one of two positions, selectively, means for adjusting said lever, and connections between the other end of said rod and one arm of the lever, said connections causing movement of the operating rod with the arm when the lever is in one position and permitting the operating rod to remain relatively stationary during operation of the steering rod when said lever is in its other position.

4. In combination with an automobile including a steering rod and an arm secured on said rod in angular relation thereto, brackets mounted on the automobile to turn about vertical axes, lights carried by said brackets, an operating rod, connections between one end of the rod and said brackets for turning the latter in accordance with movement of the former, an angle lever pivotally mounted at its angle on the arm, the pivotal axis of the lever being disposed at right angles to and in the plane of the axis of the steering rod, ball and socket connections between one arm of the lever and the other end of the operating rod, and means for adjusting said lever about its axis so as to bring the center of said ball and socket connections into and out of coincidence with the axis of said steering rod.

5. In combination with a rotatably mounted rod and an arm secured on said rod in angular relation thereto, pivotally mounted brackets, an operating rod, connections between one end of the rod and said brackets for turning the latter in accordance with movement of the former, a lever mounted on the arm and adjustable into either one of two positions, selectively, means for adjusting said lever, and connections between the other end of said rod and the lever, said connections causing movement of the operating rod with the arm when the lever is in one position and permitting the operating rod to remain relatively stationary during operation of the first mentioned rod when said lever is in its other position.

6. In combination with a rotatably mounted rod and an arm secured on said rod in angular relation thereto, an angle lever rockably mounted on the arm at its angle, pivotally mounted brackets, an operating rod, connections between one end of the operating rod and said brackets for turning the same in accordance with movement of the operating rod, ball and socket connections between the angle lever and the other end of said operating rod, and means for adjusting said lever for bringing the center of said ball and socket connections into and out of coincidence with the axis of said rotatably mounted rod.

In testimony whereof I affix my signature.

GEORGE A. TIMBLIN.